May 26, 1970  SHOZI ARAI ET AL  3,514,655
ION GAUGE FOR MONITORING VAPOR FLOW

Filed April 18, 1968  2 Sheets-Sheet 1

INVENTORS
SHOZI ARAI
TSUTOMU HIGASHIDERA

BY
ATTORNEYS

United States Patent Office 3,514,655
Patented May 26, 1970

---

3,514,655
ION GAUGE FOR MONITORING VAPOR FLOW
Shozi Arai and Tsutomu Higashidera, Hirakata-shi, Japan, assignors to Matsushita Electric Industrial Co., Ltd., Osaka, Japan, a corporation of Japan
Filed Apr. 18, 1968, Ser. No. 722,357
Int. Cl. G01f *1/00;* G01n *27/68;* G01j *41/00*
U.S. Cl. 313—7                                    5 Claims

ABSTRACT OF THE DISCLOSURE

A monitoring gauge for vapor flow used to measure a vapor flow for controlling the thickness and composition of a thin film to be formed by the vacuum evaporation of said vapor, which monitoring gauge comprises at least one ring filament or two wire filaments arranged to surround the vapor flow to be measured and which is capable of measuring the vapor flow without the disturbing of the density of distribution of said vapor flow and simple in structure and can be produced easily at low costs.

BACKGROUND OF THE INVENTION

Field of the invention

The present invention relates to a monitoring gauge for vapor flow used to measure a vapor flow for controlling the thickness and composition of a thin film to be formed by the vacuum evaporation of said vapor, and more particularly relates to a monitoring gauge of the type described which operates with an improved accuracy and sensitivity.

Description of the prior art

Various methods and gauges have been proposed heretofore for the purpose of measuring a vapor flow to control the thickness and composition of a thin film to be formed by the vacuum evaporation of the vapor. Of these methods, use of an ionization gauge has been known to be the easiest and most accurate method of measuring a vapor flow. However, with a conventional ionization gauge of the cylindrical ion collector type, Fögel type or Bayard-Alpert type, it is impossible to obtain a vacuum evaporation coating with a vapor flow of which measurement has been taken, because the vapor flow is caused turbulent by the electrodes of the ionization gauge used or the vapor densities are not uniform at a portion which is shadowed and a portion which is not shadowed geometrically.

In order to avoid such objectionable effects of the electrodes on the vapor flow, it has been practiced to dispose the ionization gauge at a location other than between a substrate and a vapor source, where the desnity of the vapor flow is considered to be the same as or proportional to that of the vapor flow at said substrate, and the measurement obtained at said location has been used for controlling the thickness or the composition a vacuum-evaporation thin film to be formed. However, such method is not entirely satisfactory because it is an extremely difficult task to ascertain that the location where the gauge is positioned satisfies the aforesaid condition and further the density distribution of the vapor flow from the vapor source does not always remain constant with the lapse of time. Therefore, in order to eliminate such problems, it becomes essential to use a vapor flow monitoring gauge which will enable the change in density distribution of the vapor flow before and after the measurement to be minimized. For instance, when the area of a substrate which is to be coated by vacuum evaporation is relatively small as in the case of simultaneous evaporation, the composition of the film to be formed thereon can be controlled far more accurately than has been possible heretofore, by disposing such monitoring gauge between the substrate and respective vapor sources.

As a monitoring gauge to fulfill the aforementioned requirement, the box type gauge, proposed by C. K. Crawford and being sold by Alloyd Electronics Corporation in Massachusetts, U.S.A., is known. However, this gauge, though its principle is extremely simple as will be illustrated later, is quite complicate in actual structure and also is very expensive.

SUMMARY OF THE INVENTION

The present invention has been achieved with a view to eliminating the above-described drawbacks of the conventional gauges for vapor flow.

Is is the object of the present invention to provide a monitoring gauge for vapor flow adapted to measure a vapor flow for controlling the thickness and composition of a thin film to be formed by the vacuum evaporation of the vapor, by which it is possible to measure the vapor flow without disturbing the density distribution thereof and which is simple in structure and can be produced easily at low cost. The monitoring gauge according to this invention is characterized by comprising at least one ring filament or at least two wire filaments. Now, the present invention will be described more fully with reference to embodiments thereof shown in the accompanying drawings.

DESCRIPTION OF THE PREFERRED EMBODIMENTS

Figure 1:
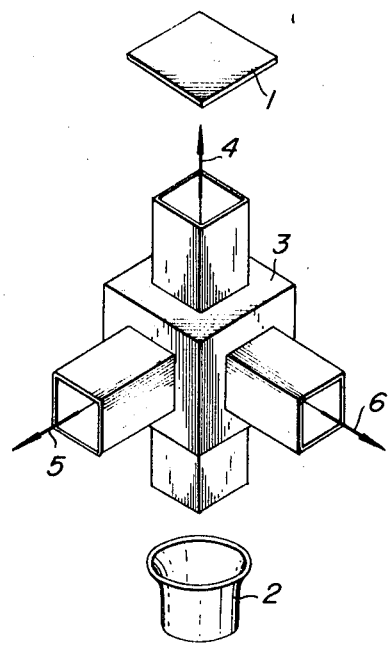
FIG. 1 is a perspective view diagrammatically illustrating the principle of a conventional method of measuring a vapor flow.

First of all, the principle of the prior art box type gauge proposed by C. K. Crawford will be explained with reference to FIG. 1. This box type gauge, as shown, consists of a box-shaped gauge element 3 which is to be interposed between a substrate 1 and a vapor source 2. In use of the gauge, an electron beam 5 is projected against a vapor flow 4, passing through said gauge, in a perpendicular direction, whereby said vapor flow is partially ionized and the ions 6 thus generated are taken out from the gauge in a direction at right angles to both the vapor flow and the electron beam for measurement of the vapor flow. In this view, this gauge can be regarded as a kind of ionization gauge, but is not entirely satisfactory for the reasons set forth previously.

Figure 2:
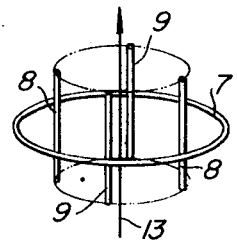
FIGS. 2 to 5 inclusive are perspective views, respectively showing basic compositions of the electrodes in the monitoring gauge according to the present invention.

FIG. 2 shows one form of the electrode composition according to the present invention, in which use is made of a ring filament. According to this composition, four wire electrodes 8 and 9 are arranged vertically at points at which the circumference of a circle concentric with a ring filament 7 is equally divided into four sections. The gauge of this electrode composition is used in the same manner as the convention ionization gauge, by maintaining each of the two pairs of diametrically opposed electrodes at the same electric potential, the electrodes 8 serving as electron collectors and the other electrodes 9 serving as ion collectors.

Figure 3:
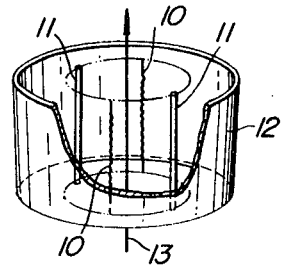

FIG. 3 shows another form of the electrode composition according to this invention. According to this form, two wire filaments 10 and two wire electrodes 11, each positioned vertically, are arranged alternately in the order of the wire filament 10, wire electrode 11, wire filament 10 and wire electrode 11, at points at which the circumference of a circle is equally divided into four sections, and these four electrodes are enclosed by a cylindrical electrode 12 concentric with said circle. In use, the two wire electrodes 11 and the cylindrical electrode 12 respectively serve as electron collectors and an ion collector or vise versa. In either case, the two filaments 10 are connected in series or in parallel depending upon the characteristic of the electron emission controller used and thereby the electric potentials of the two filaments are maintained the same.

The arrows 13 in FIGS. 2 and 3 indicate the direction of a vapor flow of which measurement is taken by the respective gauges. Although the electrode composition in the monitoring gauge of this invention is shown in FIG. 2 and 3 in terms of the specific embodiments thereof, it will be readily understood that changes can be made to the configuration and arrangement of the electron and ion collectors in the embodiments.

Figure 4:
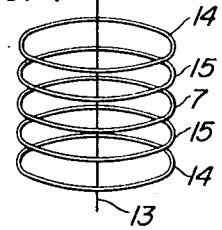
Figure 5:
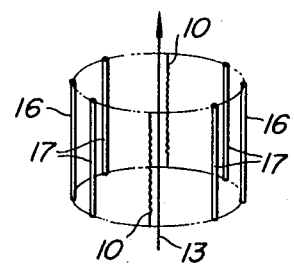

Still another form of the electrode composition of the inventive monitoring gauge is shown in FIG. 4. In this form, two ring electrodes 14 and 15 are arranged on each side above and below the ring filament 7 in vertically spaced relation, with the axes thereof in alignment with each other as shown. FIG. 5 shows still another form of the electrode composition, in which use is made of two wire filaments and, in this case, two filaments 10 and six wire electrodes 16 and 17 are disposed vertically at points at which the circumference of a circle is equally divided into eight sections, with said filaments being in diametrically opposed relation.

The monitoring gauge of the electrode composition shown in FIGS. 4 or 5 may be used in the same way as the conventional ionization gauge, by utilizing either of the ring filament 7 or the two ring electrodes 15 adjacent said ring filament 7 in FIG. 4, or the four wire electrodes 17 in FIG. 5, at the same electric potential as ion collectors, and by utilizing the remaining two ring electrodes 14 in FIG. 4 or the two wire electrodes 16 in FIG. 5 at the same electric potential as electron collectors.

The monitoring gauge for vapor flow of this invention will be further described by way of specific embodiments hereunder.

Embodiment 1

Figure 6:
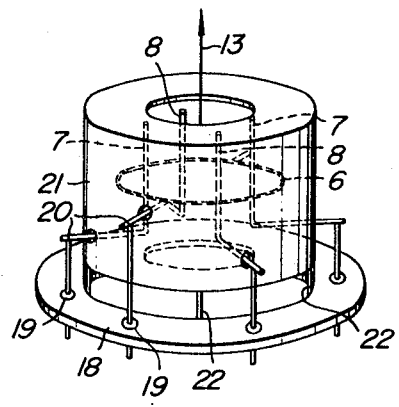
FIG. 6 is a perspective view showing the structure of an embodiment of the present invention, in which the electrodes are arranged as shown in FIG. 2.

The practical structure of a monitoring gauge in which the electrodes are arranged as shown in FIG. 2, is shown in FIG. 6.

Figure 7:
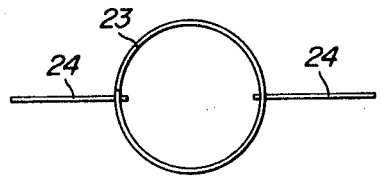
FIG. 7 is a view showing the structure of the ring filament in the monitoring gauge shown in FIG. 6 and the manner in which said ring filament used.

Referring to FIG. 6, four wire electrodes 7 and 8 each consists of a molybdenum wire of 0.6 mm. in diameter flexed in an L-shape, while a ring filament 6, as shown in FIG. 7, is composed of a ring member 23 consisting of molybdenum wire of 0.4 mm. in diameter and supporting members 24 consisting of molybdenum wire of 1.0 mm. in diameter and having one ends thereof connected to diametrically opposite points of said ring member by spot welding. These electrodes are secured to respective hermetic seals 19 by spot welding or by way of suitable supporting means, which hermetic seals are fixed to a flange 18 by electric welding. Reference numeral 20 indicates the points at which the electrodes are connected to the respective hermetic seals by spot welding.

In the actual measurement of a vapor flow by the use of this monitoring gauge, it is desirable to confine the turbulent flow of a vapor caused by the electrodes and thereby to lessen the detrimental effect of the turbulent flow in the ionic current to a minimum. This can be attained by enclosing the electrodes by a cylindrical member 21 which has annular plates at its top and bottom ends and is arranged concentrically with the center of the circle on which the four wire electrodes 7 and 8 are located, said annular plates each having a central hole whose diameter is equal to the diameter of said circle. In practice, the cylindrical member 21 is secured to the flange 18 by means of support rods 22. The support rods 22 are preferably made of an electrical insulating material. The dimensions and configurations of the electrodes and the cylindrical member are shown in Table 1 below.

TABLE 1

| Electrode | 6 | 7 & 8 | 21 |
|---|---|---|---|
| Configuration | Circular | Rectilinear | A cylinder having annular plates at the opposite ends thereof. |
| Dimensions | 30 mm. in diameter of the circle. | 14 mm. in length. | 40 mm. in inner diameter and 20 mm. in length of the cylinder, and 20 mm. in diameter of the hole in each annular plate. |

Figure 8:
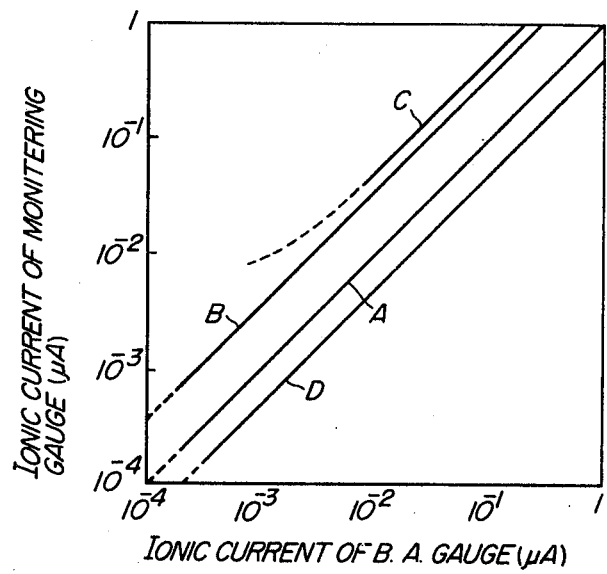
FIG. 8 is a chart illustrating the characteristics of the monitoring gauge of the structure shown in FIG. 6 and a monitoring gauge in which the electrodes are arranged as shown in FIG. 3.

In the chart of FIG. 8 is shown the ionic current with respect to air of the gauge constructed as shown in FIG. 6, with the electrodes of the dimensions and configuration shown in Table 1, in comparison with that of a Nude type Bayard-Alpert gauge having a sensitivity of $$10\mu A/\mu Hg.ma.$$

The conditions under which the gauges were used are shown in Table 2 below.

TABLE 2

| | Using method | |
|---|---|---|
| Condition | A | B |
| Electric potential of electrode 6 (volt) | 30 | 40 |
| Electric potential of electrode 7 (volt) | 250 | 300 |
| Electric potential of electrode 8 (volt) | 0 | 0 |
| Electric potential of electrode 21 (volt) | | 10 |
| Electronic current (ma.) | 0.5 | 0.5 |

All values of the ionic currents in Table 2 were obtained on the basis of the electronic current being 1 ma., and A is the case wherein the electrodes of the gauge were enclosed by the cylindrical member 21 and B is the case wherein the electrodes were not enclosed by the cylindrical member.

In Table 2, it will be seen that the conditions under which the gauge was used were varied between the cylindrical member was used and when the cylindrical member was not used. This is for the following reasons. Namely, the electric potential of the ion collector is generally maintained at the value of ion current multiplied by the resistance of the ion collector and this value is essentially zero. Thefefore, in the case of B, if the cylindrical member 21 is given an electric potential of such a value at which the electrons are pushed into inside of the gauge and the cylindrical member can hardly act as an ion collector, the sensitivity of the gauge increases. In this case, the electric potentials of the filament and the electron collector should, of course, be higher than in the case when the cylindrical member is not used. The conditions for B in Table 2 were determined upon taking this into account. On the other hand, the filament is heated by the current flowing therethrough from one supporting member 24 of molybdenum wire to another. As will be seen from the chart of FIG. 8, the sensitivity of the gauge in the case B, which is 35, is much superior to that in the case of A, which is about 10.

Embodiment 2

A monitoring gauge with the electrodes arranged as shown in FIG. 3 can be constructed readily in the same way as the gauge shown in FIG. 6. The dimensions and configuration of the electrodes in the gauge thus constructed are shown in Table 3. For the same reason as ste forth in Embodiment 1, the cylindrical member 12 is provided at both the top and bottom ends thereof with annular plates each having a central hole whose diameter is equal to the diameter of the circle on which the wire filaments 10 and the wire electrodes 11 are positioned, and the diameter of the central hole in each annular plate is also shown in Table 3 below.

TABLE 3

| Electrode | 10 | 11 | 12 |
|---|---|---|---|
| Configuration | Circular | Rectilinear | A cylinder having annular plates at the opposite ends thereof. |
| Dimensions | 34 mm. in length. | 34 mm. in length. | 40 mm. in inner diameter and 40 mm. in length of the cylinder, and 20 mm. in diameter of the hole in each member. |

The characteristics of the gauge were measured in the same manner as an Embodiment 1 under the conditions depicted in Table 4 below.

TABLE 4

| | Using methods | |
|---|---|---|
| Condition | C | D |
| Electric potential of electrode 10 (volt) | 30 | 45 |
| Electric potential of electrode 11 (volt) | 300 | ~0 |
| Electric potential of electrode 12 (volt) | ~0 | 200 |
| Electronic current (ma.) | 0.5 | 0.5 |

The characteristics of the gauge in the respective cases C and D are represented by the lines C and D in the chart of FIG. 8. Namely, the line C represents the characteristic of the gauge when the wire electrodes and the cylindrical electrode were used as electron collector and an ion collector respectively, whereas the line D represents the characteristic of the gauge when the wire electrodes and the cylindrical electrode were used as ion collectors and an electron collector respectively. As seen in the chart, the sensitivity of the gauge is 50 in the case of C and 5 in the case of D.

The sensitivity of the gauge in the case of C is even higher than that of the gauge in the case of B in Embodiment 1 and no ionization gauge has ever been available which has such a high sensitivity. The gauge in the case of D has a sensitivity considerably lower than that of the conventional ionization gauges and therefore is of no particular value as an ionization gauge. However, this gauge has advantages which are not obtainable from the gauge in the case of C, in vacuum evaporation coating using a measured vapor flow, particularly in vacuum evaporation coating under a highly vacuum condition.

The vapor flow monitoring gauges constructed in the manner described in Embodiments 1 and 2, and the Nude type B.A. gauge, were arranged side by side at a location 30 cm. apart from a conical basket type vapor source and the ionic currents produced by the vapor flows passing through the respective gauges were measured for comparison. As a result, it has been acknowledged on every gauges that the ionic current obtained is in substantial proportion to the sensitivity of the gauge used.

The monitoring gauge for vapor flow according to the present invention has the following advantages. Namely, as may be understood from the foregoing description, by the use of the monitoring gauge of this invention, vacuum evaporation coating with a measured vapor flow can be achieved easily, which has been extremely difficult with the conventional gauges. This is high advantageous, for example, in studying the conditions under which various thin films are formed by vacuum evaporation or in reproducing the production conditions during the mass production of these films. Another advantage of the inventive monitoring gauge exists in the variety of the structure thereof. Because of this advantage, it is possible for the user to select a monitoring gauge of the structure most suitable for a given method of vacuum evaporation. Namely, a gauge comprising a ring filament is generally adapted for use in vacuum evaporation in which the length in the vapor flow direction of a gauge to be used is short or the cross sectional area of a vapor flow passing through a gauge is required to be large, due to the limited space for the gauge available in the vacuum evaporation apparatus used. On the contrary, in the case as of simultaneous evaporation of components which form a compound alloy, a monitoring gauge comprising two wire filaments, particularly the one of the structure shown in FIG. 2, is suitably used.

Furthermore, according to the present invention, satisfactory vacuum evaporation coating with a measured vapor flow can be attained under a residual gas pressure of higher than $10^{-6}$ mm. Hg by selectively using a monitoring gauge whose sensitivity is five times as high as that of the conventional ionization gauge and under a residual gas pressure of lower than $10^{-6}$ mm. Hg by selectively using a monitoring gauge whose sensitivity is two or three times as high as that of the conventional ionization gauge.

Still further, according to the present invention, the detrimental effect of an error in dimension or in position of the constituent electrodes on the sensitivity of the gauge can be minimized, because an excellent symmetry of the electrode arrangement can be obtained in the gauge with respect to the axis of the vapor flow passing through said gauge as well as in a plane perpendicular to said axis of the vapor flow. Such arrangement of the electrodes also enables the structure of the gauge to be much simplified, making the production process of the gauge extremely easy. These advantages are solely brought about by the use of the ring filament or two wire filaments. It may be thought that a monitoring gauge of a structure having fairly good symmetry could be obtained by enclosing diametrically opposed single wire filament and single wire electrode by a cylindrical electrode. In such gauge, however, the electron current tends to form a space-charge limit zone and thereby the characteristic of the gauge becomes considerably unstable. The remarkable effect of using the ring filament or two wire electrodes will be apparent even from this fact alone.

We claim:

1. A monitoring gauge for vapor flow beam, comprising at least one filament means for emission of thermal electrons, at least one electron collector means for collection of said electrons and at least one ion collector means for collection of ions of said beam generated upon collision against said electrons, all of said means being electrically insulated from each other and arranged symmetrically in such a manner that substantially the same electrode arrangement will be obtained on every 180° rotation of the gauge around the axis of said beam.

2. A monitoring gauge for vapor flow beam, comprising one ring filament means and four wire electrodes arranged in positions at which the circumference of a circle concentric with said ring filament is equally divided into four sections.

3. A monitoring gauge for vapor flow beam, comprising two filament means and two wire electrodes alternately arranged in positions at which the circumference of a circle is equally divided into four sections, and a cylindrical electrode arranged concentrically with said circle and enclosing said four electrodes therein.

4. A monitoring gauge for vapor flow beam, comprising one ring filament means and four ring electrodes two of which are arranged above and another two of which are arranged below said ring filament means in concentrical relation thereto.

5. A monitoring gauge for vapor flow beam, comprising two filament means and six wire electrodes arranged in positions at which the circumference of a circle is equally divided into eight sections, with said two filament means being in diametrically opposed relation.

References Cited
UNITED STATES PATENTS 2,870,358  1/1959  Moesta _____ 313—7
3,316,443  4/1967  Hansen _____ 313—7 X JAMES W. LAWRENCE, Primary Examiner C. R. CAMPBELL, Assistant Examiner U.S. Cl. X.R.
73—194; 324—33